United States Patent [19]

Townsend

[11] 4,246,303
[45] Jan. 20, 1981

[54] DUAL DUROMETER ELONGATE BODY SIDE MOULDING

[75] Inventor: Walter S. Townsend, Huntingdon, England

[73] Assignee: Silent Channel Products Limited, Cambridgeshire, United Kingdom

[21] Appl. No.: 36,515

[22] Filed: May 7, 1979

[30] Foreign Application Priority Data

May 21, 1978 [GB] United Kingdom ............... 19076/78

[51] Int. Cl.³ .......................... B60R 13/04; B32B 7/02
[52] U.S. Cl. .......................................... 428/31; 428/36; 428/156; 428/188; 428/217; 428/218; 428/343; 52/716; 52/717; 293/122; 293/128
[58] Field of Search ............................ 428/31, 217, 36; 49/498, 475; 293/126, 128, 122, 120; 52/716, 717

[56] References Cited

U.S. PATENT DOCUMENTS

| 3,360,887 | 1/1968 | Parks et al. | 49/498 |
| 3,531,348 | 9/1970 | Kunevicius | 428/31 X |
| 3,687,502 | 8/1972 | Loew | 293/128 |
| 3,775,907 | 12/1973 | Weaver et al. | 49/498 X |
| 3,883,993 | 5/1975 | Pullan | 49/498 X |
| 3,982,780 | 9/1976 | Keith | 428/31 X |
| 4,002,362 | 1/1977 | Sears et al. | 293/128 X |
| 4,042,741 | 8/1977 | Bright | 428/217 |

FOREIGN PATENT DOCUMENTS 1522634 8/1978 United Kingdom ................. 428/83

Primary Examiner—Marion McCamish
Assistant Examiner—Alexander S. Thomas
Attorney, Agent, or Firm—Harness, Dickey & Pierce

[57] ABSTRACT

A dual durometer, elongate body side moulding suitable for application to a side of a vehicle body, has a base region which is intended to be secured by adhesive to the vehicle body and which is formed of a relatively hard synthetic rubber or other plastics material, the moulding also having lateral regions and outermost regions (i.e. forward-facing regions) formed of a relatively soft synthetic rubber or other plastics material, the moulding being relatively flexible perpendicular to the plane of the base region and being intended to absorb the impact of a door of another vehicle.

1 Claim, 5 Drawing Figures

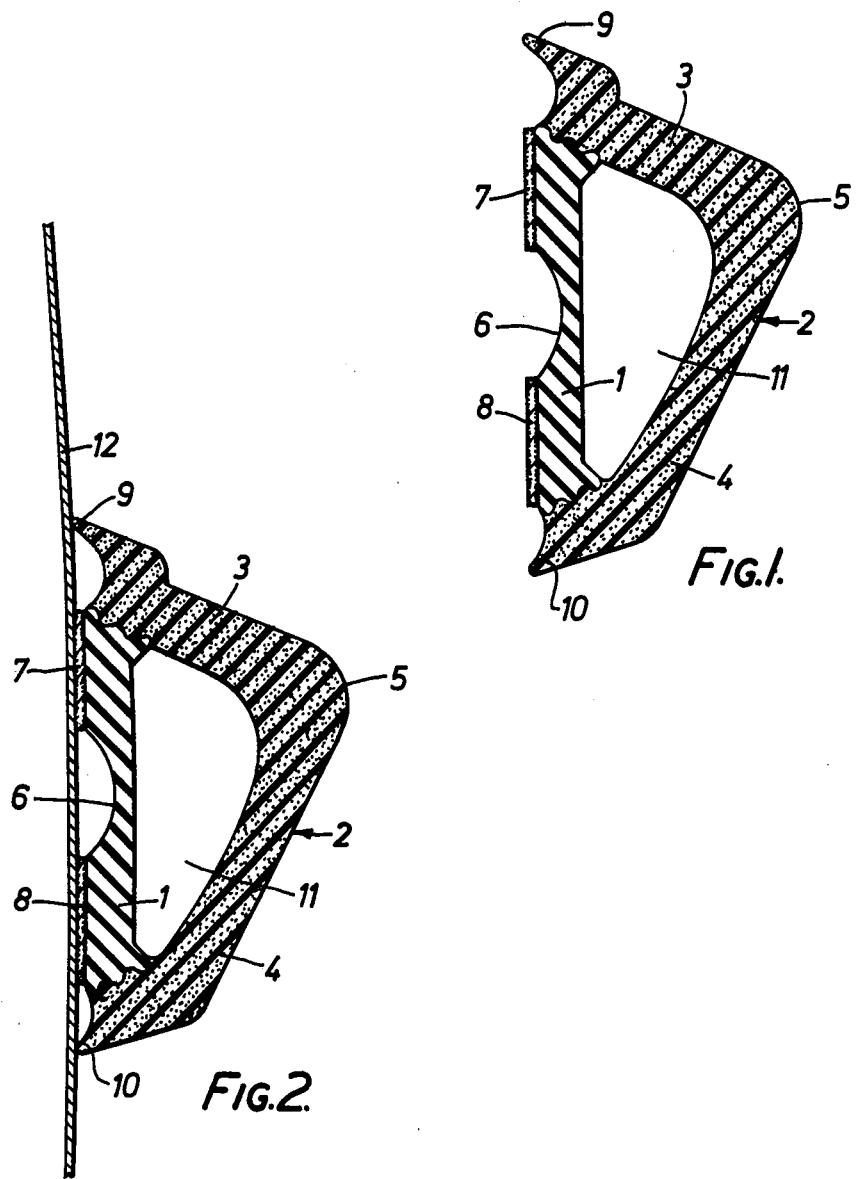

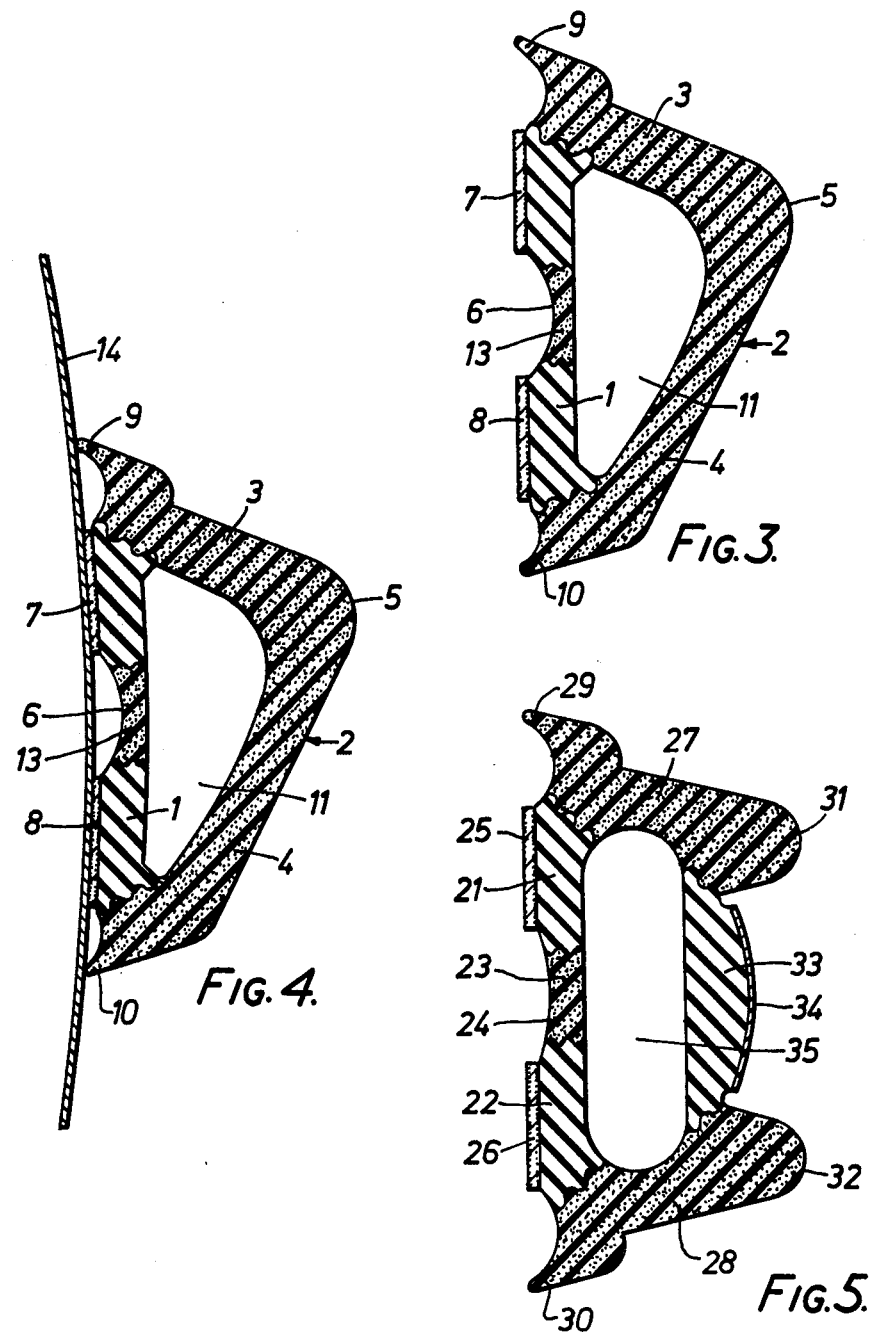

DUAL DUROMETER ELONGATE BODY SIDE MOULDING

BACKGROUND OF THE INVENTION

This invention relates to a dual durometer, elongate body side moulding suitable for application to a side of a vehicle body.

Body side mouldings are known for application to the sides of vehicle bodies and such mouldings may serve a decorative purpose and/or a protective purpose. Hitherto, such mouldings have been formed of a relatively hard synthetic rubber, for example a rubber of the ebonite type having a Shore hardness of 95, and it is known to employ an adhesive for applying such mouldings to the side of a vehicle body; the adhesive may be on both sides of a tape, with one side of the tape adhering to the moulding and the other side of the tape adhering to the side of the vehicle body. Unfortunately, so far as we are aware, it is not practicable to employ such adhesives with a relatively soft synthetic rubber or other plastics material, although, from the point of view of absorbing impact, for instance that caused by a door of another vehicle, it is desirable that a vehicle body side moulding is formed of a relatively soft material.

Also found in many motor vehicles is a window seal, or glass run channel, in the region of the reciprocable sheet of glazing material, for sealing and/or supporting that sheet; the seal or channel has a main part secured over a flange or between flanges and an arm projecting from the main part; the arm may be formed of a softer material than the main part, thus making the arm more flexible to serve effectively as a sealing part. A window seal or glass run channel formed of materials of two different hardnesses is referred to as being of the dual durometer type.

SUMMARY OF THE INVENTION

According to the present invention, there is provided a dual durometer, elongate body side moulding suitable for application to a side of a vehicle body, the moulding having a base region which is intended to be secured by means of an adhesive provided thereon to a vehicle body and which is formed at least partially from a relatively hard material selected from the group consisting of synthetic rubber and other plastics materials, with lateral regions of the moulding and outermost region(s) of the moulding, as determined in terms of the distance measured perpendicularly from the plane(s) in which the base region generally lies, being formed from a relatively soft material selected from the group consisting of synthetic rubber and other plastics materials, the moulding being relatively flexible in a direction perpendicular to the said plane(s) and relatively inflexible within the said plane(s), the arrangement of the moulding being such that, in use, with the moulding adhered to the side of a vehicle body, when a door of another vehicle strikes the moulding, the door directly contacts the outermost region(s) of relatively soft material which is capable of absorbing the impact.

The elongate moulding of the present invention is indicated as being a dual durometer moulding, and this, as indicated above, is intended to mean that there are at least two different materials of different hardnesses present in the moulding; it is not intended to preclude the case in which three or more different materials of three or more different hardnesses are present in the moulding.

Generally, but not necessarily, the elongate moulding is provided with an elongate internal hollow zone which, on impact, assists in the absorption of the impact by allowing for distortion of the moulding and take-up of the relatively soft lateral regions within the hollow zone.

As regards any elongate internal hollow zone present, the magnitude of the cross-section of the zone will probably affect production costs and also affect the impact absorption, and these factors may be taken into account when designing the cross-section of the moulding.

The relatively hard synthetic rubber or other plastics material generally, but not necessarily, has a Shore hardness in the range from 80 to 100, preferably from 85 to 100, conveniently 95. The relatively hard material may be, for example, a styrene butadiene rubber, or a composition of a styrene butadiene rubber with up to 20 parts of neoprene, or an ebonite type synthetic rubber, or a relatively rigid polyvinyl chloride.

Generally, but not necessarily, the relatively soft synthetic rubber or other plastics material has a Shore hardness in the range from 45 to 80, preferably from 60 to 80, conveniently approximately 70. The relatively soft material may be, for example, neoprene, an ethylene propylene diene monomer, a styrene butadiene rubber, or a relatively soft polyvinyl chloride.

The adhesive used to secure the base region of the moulding to a vehicle body may be, but is not necessarily, a double-sided adhesive tape, for example a strip of foam with adhesive on both sides. The foam of the strip may be, for example, neoprene foam or polyvinyl chloride foam; and the adhesive employed may be an acrylic adhesive.

If desired the whole of the base region may be formed of the relatively hard synthetic rubber or other plastics material, and such an arrangement is appropriate where the moulding is intended to be applied to a planar or only gently curved surface. If, however, it is intended to apply the moulding to a more strongly curved surface, a central portion of the base region may be formed of a relatively soft, and hence flexible, synthetic rubber or other plastics material, with the portions on either side of the central portion being formed of the relatively hard material; such an arrangement allows increased flexing so that the relatively hard portions of the base region can be substantially parallel to the side of the vehicle body.

Regardless of whether the whole of the base region is formed of the relatively hard material or whether a central portion of the base material is formed of the relatively soft material, an elongate groove can be provided in the centre of that face of the base region intended to face the vehicle body, to assist in the flexing of the moulding to make it suitable for use with a contoured vehicle body.

The moulding may, if desired, be provided with elements in the form of "arms" or "wings" disposed such that, when the moulding is secured to the vehicle body, they abut the body and prevent or reduce the penetration of adverse elements to the adhesive.

If desired, the moulding according to the present invention may be provided with a bright decoration in a region other than the outermost regions. Thus, for instance, there may be provided between two mirror image outermost regions of relatively soft material an intermediate region of relatively hard material bearing a bright decoration. The bright decoration may be, for example, in the form of:

(a) a polyvinyl chloride backing strip provided with a metallised polyester layer, optionally protected by a clear polyvinyl chloride film;

(b) a polyvinyl chloride backing strip provided with a metallised polyester layer, optionally protected by a clear polyvinyl fluoride film (known as Tedlar);

(c) a stainless steel foil; or (d) a brightened aluminium foil.

The thickness of the lateral regions of the moulding can be selected according to the overall size of the moulding, but is preferably chosen so that there is sufficient flexibility in these regions to absorb impact.

The mouldings according to the present invention can be produced by extrusion in a technique which involves the relatively soft material being extruded through the same die head as the relatively hard material, in a manner such that the regions formed of relatively soft material are bonded (without the aid of any adhesive) to the regions formed of relatively hard material whilst the materials are still at least partially softened. After an appropriate curing stage, the adhesive can be applied to the base region.

Generally the base region will be planar or substantially planar although, in the case in which it is intended that the moulding will be applied to a vehicle body in a region where two planes meet at an angle, the base region of the moulding can be provided with two inclined planar surfaces to be positioned parallel to the two planes of the vehicle body side.

To provide an attractive finish to a moulding according to the present invention, when it is applied to a vehicle body, there may be positioned against the opposite ends of the moulding suitable moulded end pieces, which can be provided with similar adhesive strips to secure the end pieces to the vehicle body. The end pieces may be chamfered or have any other tapering effect to provide an attractive appearance. If desired, the moulded end pieces may be provided with projections which can be located in appropriate recesses to be formed in the end regions of the elongate moulding; alternatively, both the end regions of the moulding and the moulded end pieces may be provided with appropriate recesses in which dowels may be located.

For a better understanding of the present invention and to show how the same may be carried into effect, reference will now be made, by way of example, to the accompanying drawings, in which:

FIG. 1 is a cross-section through one embodiment of an elongate moulding according to the present invention, in the relaxed state;

FIG. 2 is a cross-section through the moulding shown in FIG. 1, applied to a gently contoured panel of a vehicle body;

FIG. 3 is a cross-section through a different embodiment of an elongate moulding according to the present invention, in the relaxed state;

FIG. 4 is a cross-section through the moulding of FIG. 3, applied to a more strongly contoured panel of a vehicle body; and FIG. 5 is a cross-section through a third embodiment of an elongate moulding according to the present invention, in the relaxed state.

Referring first to FIGS. 1 and 2, the moulding has a base region 1 formed of relatively hard material, in this case a material having a Shore hardness of 95. Secured to the base region 1 is material 2 which is relatively soft and which has a Shore hardness of 70. The material 2 is present in an upper lateral region 3, a lower lateral region 4 and an outermost region 5. The base region 1 is provided with a central elongate groove 6 on that face which is to face the vehicle body, and the base region 1 is provided on either side of the groove 6 with double-sided adhesive tapes 7 and 8. The soft material 2 is also used to form "wings" 9 and 10. Enclosed by the base region 1 and the soft material 2 is an elongate hollow zone 11.

In FIG. 2, the moulding of FIG. 1 is shown secured to a side panel 12 of a vehicle body. The moulding is secured by means of the adhesive tapes 7 and 8 and it can be seen that the wings 9 and 10 abut the side panel 12 to prevent or reduce adverse elements reaching the adhesive tapes 7 and 8.

The moulding of FIG. 3 is similar in many respects to the moulding of FIG. 1 and the same reference numerials are used in these Figures to indicate identical components. In fact, the sole difference between the mouldings of FIGS. 1 and 3 is that in FIG. 3 a central portion 13, opposite the groove 6, of the base region 1 is formed of a relatively soft material. This assists in the flexing of the base region 1 of the elongate moulding when applied to a more strongly curved side panel 14 of a vehicle body, as shown in FIG. 4.

The elongate moulding shown in FIG. 5 has a base region formed of three portions, namely an upper portion 21 of relatively hard material, a lower portion 22 of relatively hard material, and between the portions 21 and 22 a central portion 23 of relatively soft material. The base portion is provided with a groove 24 on that face intended to face the vehicle body. The portion 21 is provided with a double-sided adhesive tape 25, and the portion 22 is provided with a double-sided adhesive tape 26. The moulding has two lateral regions, 27 and 28, of relatively soft material which project forwards from the portions 21 and 22, respectively. The lateral regions 27 and 28 terminate at their rear ends in wings 29 and 30 (intended to prevent adverse elements reaching the adhesive tapes 25 and 26), and terminate at their forward, opposite ends in outermost regions 31 and 32.

Extending between the lateral regions 27 and 28, but at a position not so far forward as the outermost regions 31 and 32, is a carrier 33 of relatively hard material, to the forward face of which is applied a decorative layer 34. The moulding is provided with an internal elongate hollow zone 35. In the embodiments illustrated in FIGS. 1 to 5 the relatively hard material may be selected from any of the relatively hard materials indicated above, and the relatively soft materials may be selected from any of the relatively soft materials indicated above. The adhesive tapes 7, 8, 25 and 26 may be, for example, double-sided adhesive tapes as produced by 3 M.

In FIG. 5 the decorative layer 34 may be selected from any one of the decorative materials (a), (b), (c) and (d) indicated above.

I claim:

1. An elongated dual durometer body side moulding for application to an arcuate side portion of a vehicle body in a direction generally parallel to the axis of generation of said arcuate side portion, said moulding comprising a pair of spaced elongated parallel generally flat base portions of relatively hard plastic material having a Shore hardness in the range from 85 to 100, said base portions being connected by an intermediate portion of relatively soft plastic material having a Shore hardness in the range of 45 to 80 and a cross-sectional area less than that of said base portions to facilitate bending of said side moulding about a longitudinal axis thereof, said base portions having laterally spaced attachment surfaces on one side thereof, respectively, for the acceptance of a pair of adhesive tapes, an elongated generally U-shaped impact absorbing member defined by spaced leg portions connected by a bight portion, said impact absorbing member being of relatively soft plastic material having a Shore hardness in the range from 45 to 80, the leg portions of said impact absorbing member being secured to said base portions, respectively, and overlying and extending beyond opposite edges thereof for engagement with the surface of said vehicle body, the leg and bight portions of said impact absorbing member defining a laterally extending internally hollow zone on the opposite side of said base portions from the attachment surfaces thereof, and, a pair of adhesive tapes having faces thereof, respectively, secured to the attachment surfaces of said base portions.

* * * * *